United States Patent
Yoshimura

(10) Patent No.: US 7,533,267 B2
(45) Date of Patent: May 12, 2009

(54) ANTI-TAMPERING SIGNATURE METHOD FOR REWRITABLE MEDIA, ANTI-TAMPERING SIGNATURE APPARATUS FOR EXECUTING THE METHOD, ANTI-TAMPERING SIGNATURE SYSTEM PROVIDED WITH THE APPARATUS, AND COMPUTER-READABLE RECORDING MEDIUM STORING ANTI-TAMPERING SIGNATURE PROGRAM FOR ACHIEVING THE METHOD

(75) Inventor: Hideyoshi Yoshimura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 561 days.

(21) Appl. No.: 10/520,717

(22) PCT Filed: Jul. 7, 2003

(86) PCT No.: PCT/JP03/08631

§ 371 (c)(1),
(2), (4) Date: Jan. 6, 2005

(87) PCT Pub. No.: WO2004/008684

PCT Pub. Date: Jan. 22, 2004

(65) Prior Publication Data
US 2005/0273611 A1    Dec. 8, 2005

(30) Foreign Application Priority Data
Jul. 10, 2002    (JP)    ............... 2002-201444

(51) Int. Cl.
*H04L 9/00*    (2006.01)
*G06F 7/04*    (2006.01)

(52) U.S. Cl. .............. 713/176; 713/155; 713/166; 713/177; 713/180; 726/21

(58) Field of Classification Search .................. None
See application file for complete search history.

(56) References Cited

U.S. PATENT DOCUMENTS 5,898,779 A * 4/1999 Squilla et al. ............... 713/176

(Continued)

FOREIGN PATENT DOCUMENTS

EP    0 599 558 A2    11/1993

(Continued)

OTHER PUBLICATIONS

English language translation of: Takashi Kitamura, "Summary on Electronic Paper and Toner Display", JAGAT info published on Feb. 15, 2001, vol. 354, pp. 42-44.

*Primary Examiner*—Nasser G Moazzami
*Assistant Examiner*—Fatoumata Traore
(74) *Attorney, Agent, or Firm*—Edwards Angell Palmer & Dodge LLP; David G. Conlin; David A. Tucker

(57) ABSTRACT

An anti-tampering signature apparatus is provided with an extraction portion 33 for extracting a characteristic quantity that represents a characteristic of image data according to an instruction from a certifier who has certified display data, an encryption/decryption portion 35 that generates encrypted data by encrypting the characteristic quantity using an encryption key paired with an identifier and decrypts the encrypted data into the characteristic quantity, a media writing portion 34 that appends the identifier and the encrypted data to a rewritable medium, and a controller 37 that judges whether or not the decrypted characteristic quantity and the characteristic quantity extracted from image data generated by reading the display data match.

4 Claims, 8 Drawing Sheets

U.S. PATENT DOCUMENTS

| | | |
|---|---|---|
| 5,948,103 A | 9/1999 | Fukuzaki |
| 6,704,906 B1 * | 3/2004 | Yankovich et al. ........... 715/222 |
| 6,807,633 B1 * | 10/2004 | Pavlik ........................ 713/170 |
| 2003/0217275 A1 * | 11/2003 | Bentley et al. ............... 713/184 |
| 2006/0041760 A1 * | 2/2006 | Huang ........................ 713/189 |

FOREIGN PATENT DOCUMENTS

| | | |
|---|---|---|
| EP | 1 039 420 A2 | 9/2000 |
| EP | 1 081 936 A2 | 3/2001 |
| JP | 7-36383 | 2/1995 |
| JP | 08-002155 | 1/1996 |
| JP | 11-261550 | 9/1999 |
| JP | 2000-313185 | 11/2000 |
| JP | 2001-251295 | 9/2001 |
| JP | 2002-40936 A | 2/2002 |
| JP | 2002-62803 | 2/2002 |
| WO | WO-97/12460 | 4/1997 |

* cited by examiner (a)  41

(b)  42

(c)  43

(d)  44

ANTI-TAMPERING SIGNATURE METHOD FOR REWRITABLE MEDIA, ANTI-TAMPERING SIGNATURE APPARATUS FOR EXECUTING THE METHOD, ANTI-TAMPERING SIGNATURE SYSTEM PROVIDED WITH THE APPARATUS, AND COMPUTER-READABLE RECORDING MEDIUM STORING ANTI-TAMPERING SIGNATURE PROGRAM FOR ACHIEVING THE METHOD

TECHNICAL FIELD

The present invention relates to anti-tampering signature methods for rewritable media on which display data can be written and erased, anti-tampering signature apparatuses for executing such a method, anti-tampering signature systems provided with such an apparatus, anti-tampering signature programs for achieving such a method, and computer-readable recording media storing such an anti-tampering signature program. In particular, the present invention relates to anti-tampering signature methods for rewritable media for preventing tampering with display data, anti-tampering signature apparatuses for executing such a method, anti-tampering signature systems provided with such an apparatus, anti-tampering signature programs for achieving such a method, and computer-readable recording media storing such an anti-tampering signature program.

BACKGROUND ART

Conventionally, when handling paper-based certification such as contracts, certification to the effect that the contents have been verified is carried out by having the certifier sign with a ball pen or affix a seal or the like using ink. However, when such paper-based certification becomes unnecessary, since ink or the like has permeated into the paper, there is the problem that it is not possible to delete the text or other markings and reuse the paper.

For this reason, from the viewpoint of effective use of resources, attention has been given in recent years to the use of certification that does not use paper. As conventional examples of an anti-tampering signature system used in creating certification without using paper and an anti-tampering signature method that is executed using this system, an electronic document anti-tampering system and method are disclosed in JP H11-261550A for example. The signatures used by the electronic signature technology used in this electronic document anti-tampering system and method are signatures in which a characteristic quantity is extracted from the electronic data then encrypted using a private key and sent appended to the electronic data. Then, the recipient of the electronic data verifies that the received electronic data has not been tampered with by decrypting the characteristic quantity with a public key and checking that the characteristic quantity of the received electronic data and the decrypted characteristic quantity match.

Furthermore, as a conventional example of certification that does not use paper, a non-contact IC (integrated circuit) certificate having a rewrite display portion is disclosed in JP 2000-313185A. The non-contact IC certificate is displayed in the rewrite display portion of rewritable media. Rewritable media refers to media in which the contents of display data can be written and erased using electric, magnetic, thermal, or other such external factors. Examples of such rewritable media include media that use microcapsules containing toner, media that use liquid crystal such as ferroelectric liquid crystal, and media that use leuco dyes, and the certificates created using these rewritable media are reusable.

However, since it is premised that the certificates of the above-mentioned electronic signature technology are electronic documents, a viewing apparatus is necessary when carrying out certification, and therefore there is a problem that certification cannot be carried out with the medium as a discrete entity.

On the other hand, with rewritable media that display the above-mentioned non-contact IC certificates, since the rewritable medium itself is not provided with a function to certify the recorded display data, there is the problem that a complicated process is necessary in issuing certificates.

The present invention has been devised to solve these issues, and it is an object thereof to provide an anti-tampering signature method for rewritable media that can easily carry out certification with the medium as a discrete entity, an anti-tampering signature apparatus for executing the method, an anti-tampering signature system provided with the apparatus, an anti-tampering signature program for achieving the method, and a computer-readable recording medium for recording the anti-tampering signature program.

DISCLOSURE OF INVENTION

An anti-tampering signature method for rewritable media according to the present invention, wherein display data displayed on a rewritable medium that displays display data stored in a writeable and erasable state is certified, is provided with: an extraction step of extracting a characteristic quantity from image data that is generated by reading the display data according to an instruction from a certifier who has certified the display data, a data generation step of generating encrypted data by encrypting the characteristic quantity using an encryption key paired with an identifier, an appending step of appending the identifier and the encrypted data to the rewritable medium, and a judgment step of obtaining the encryption key based on the identifier according to an instruction of a verifier who verifies a certificate and judging whether or not the characteristic quantity obtained by decrypting the encrypted data, and the characteristic quantity of the display data match.

In the present description, "characteristic quantity" refers to a quantity that represents a characteristic of the read display data. For example, it is possible to obtain a characteristic quantity from a value calculated from a display character shape with a distinct edge, or from the actual display contents in a rewritable medium in which the display contents are electronically readable.

Furthermore, the method of recording the encrypted data may include recording a barcode, or magnetic recording by providing a magnetic layer, and it is also possible to record by mounting an IC chip.

The above-mentioned configuration may be a configuration in which the extraction step uses as a characteristic quantity a general characteristic extracted from image data generated by reading the display data.

Here, "general characteristic" refers to, for example, the medians, slants and line lengths of individual elements in the case of carrying out broken line approximation of an image.

In this configuration, at the time of querying, even when the currently displayed image data does not completely agree with the image data of the encrypted data due to fluctuations or the like during image data reading, the characteristic quantity is the same and assumed to match so that it can be judged that there is no tampering.

An anti-tampering signature apparatus according to the present invention for executing an anti-tampering signature method for rewritable media wherein display data displayed on a rewritable medium that displays display data stored in a writeable and erasable state is certified, is provided with: a characteristic quantity extraction means for extracting a characteristic quantity that represents a characteristic of image data generated by reading the display data according to an instruction from a certifier who has certified the display data, an encryption/decryption means that generates encrypted data by encrypting the characteristic quantity using an encryption key paired with an identifier, and decrypts the encrypted data into the characteristic quantity, an appending means for appending the identifier and the encrypted data to the rewritable medium, and a tampering judgment means for judging whether or not the decrypted characteristic quantity and the characteristic quantity of the display data match.

An anti-tampering signature system according to the present invention, wherein display data displayed on a rewritable medium that displays display data stored in a writeable and erasable state is certified, is provided with: an encryption key generating means that registers an identifier and generates an encryption key, a storage means for storing the identifier and the encryption key, a certifying means that supplies the encryption key according to a query based on the identifier, and an anti-tampering signature apparatus provided with a characteristic quantity extraction means for extracting a characteristic quantity that represents a characteristic of image data generated by reading the display data according to an instruction from a certifier who has certified the display data, an encryption/decryption means that generates encrypted data by encrypting the characteristic quantity using an encryption key paired with an identifier, and decrypts the encrypted data into the characteristic quantity, an appending means for appending the identifier and the encrypted data to the rewritable medium, and a tampering judgment means for judging whether or not the decrypted characteristic quantity and the characteristic quantity of the display data match.

An anti-tampering signature program for achieving the anti-tampering signature method for rewritable media according to the present invention, wherein display data displayed on a rewritable medium that displays display data stored in a writeable and erasable state is certified, is provided with: an extraction step of extracting a characteristic quantity from image data that is generated by reading the display data according to an instruction from a certifier who has certified the display data, a data generation step of generating encrypted data by encrypting the characteristic quantity using an encryption key paired with an identifier, an appending step of appending the identifier and the encrypted data to the rewritable medium, and a judgment step of obtaining the encryption key based on the identifier according to an instruction of a verifier who verifies a certificate and judging whether or not the characteristic quantity obtained by decrypting the encrypted data, and the characteristic quantity of the display data match.

A computer-readable recording medium according to the present invention on which the anti-tampering signature program is recorded achieves the anti-tampering signature method for rewritable media, wherein display data displayed on a rewritable medium that displays display data stored in a writeable and erasable state is certified, includes: an extraction step of extracting a characteristic quantity from image data that is generated by reading the display data according to an instruction from a certifier who has certified the display data, a data generation step of generating encrypted data by encrypting the characteristic quantity using an encryption key paired with an identifier, an appending step of appending the identifier and the encrypted data to the rewritable medium, and a judgment step of obtaining the encryption key based on the identifier according to an instruction of a verifier who verifies a certificate and judging whether or not the characteristic quantity obtained by decrypting the encrypted data, and the characteristic quantity of the display data match.

In any of the above-described configurations according to the present invention, when the contents of the display data of the rewritable medium that displays display data stored in a writable and erasable state are certified, the display data is read and a characteristic quantity is digitized according to an instruction from the certifier, and this data can then be encrypted and appended to the rewritable medium. An identifier, which is graphic data of the certifier's signature data or the like is also appended to the rewritable medium at this time. Further still, encryption keys for encryption/decryption are generated as a pair with the identifier, and the side that receives the rewritable medium can obtain an encryption key using the identifier and carry out decryption. As a result of this, by obtaining the characteristic quantity of the display data at the time of certification and comparing this characteristic quantity and the characteristic quantity of the display data that is currently displayed, a judgment can be made as to whether or not the data is in agreement.

BRIEF DESCRIPTION OF THE DRAWINGS

FIG. 8 is an explanatory diagram of a case in which there is an angular difference between the horizontal lines of the rewritable medium and the horizontal lines when read in.

BEST MODE FOR CARRYING OUT THE INVENTION

Hereinafter, embodiments of the anti-tampering signature method for rewritable media, anti-tampering signature apparatus for executing the method, anti-tampering signature system provided with the apparatus, anti-tampering signature program for achieving the method, and computer-readable recording media for recording the anti-tampering signature program according to the present invention are described with reference to the appended drawings.

Figure 1:
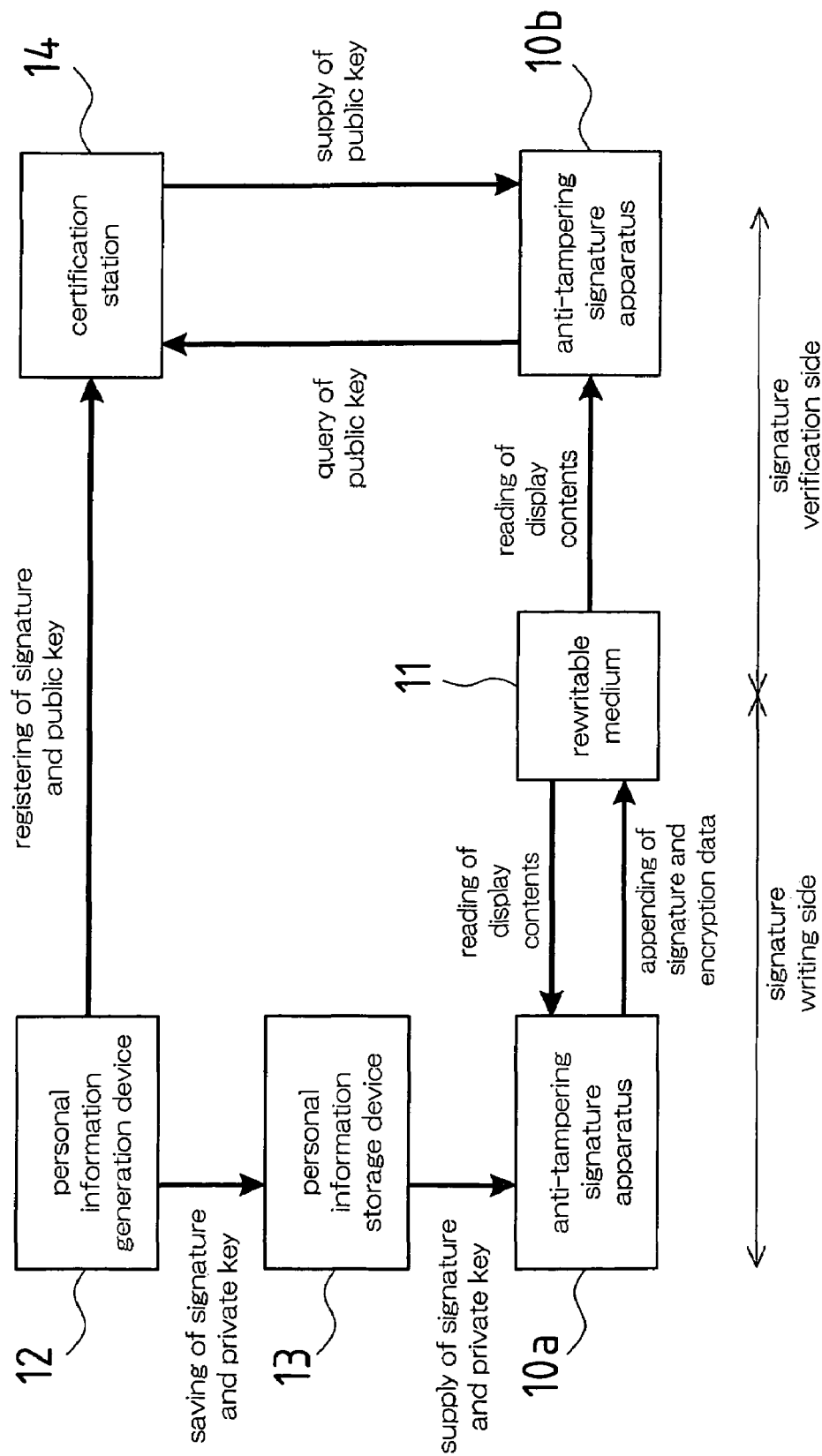
FIG. 1 is an explanatory diagram showing an embodiment of an anti-tampering signature system according to the present invention.

FIG. 1 is an explanatory diagram showing an embodiment of an anti-tampering signature system according to the present invention.

This anti-tampering signature system is constituted by a personal information generation device 12 as a means for generating an encryption key, a personal information storage device 13 as a storage means, a certification station 14 as a certification means, a rewritable medium 11, and anti-tampering signature apparatuses 10a and 10b.

Here, a certifier uses the personal information generation device 12, the personal information storage device 13, and the anti-tampering signature apparatus 10a, which are shown on the left side (signature writing side) in FIG. 1, to certify and sign the display data shown on the rewritable medium 11, then, after the certifier signs, a verifier uses the certification station 14 and the anti-tampering signature apparatus 10b, which are shown on the right side (signature verification side) in FIG. 1, to verify that the display data shown on the rewritable medium 11 has not been tampered with.

The personal information generation device 12 generates digitized signature data (namely, an identifier) 2 by taking graphic data chosen by a user as a signature, then generates a private key (encryption key) and a public key (encryption key), which form a pair with the signature data, using a public key encryption method (for example, the public key encryption method known as the RSA public key encryption method invented in 1977 by Rivest, Shamir, and Adleman of Massachusetts Institute of Technology).

Furthermore, the personal information storage device 13 is constituted by a flash memory card for example, saves the signature data and the private key generated by the personal information generation device 12, and supplies the signature data and the private key to the anti-tampering signature apparatus 10a on the signature writing side.

Further still, the certification station 14 saves the signature data and its counterpart public key, and supplies the target information and the public key to the anti-tampering signature apparatus 10b based on the signature verification side carrying out a query using the signature data.

Figure 2:
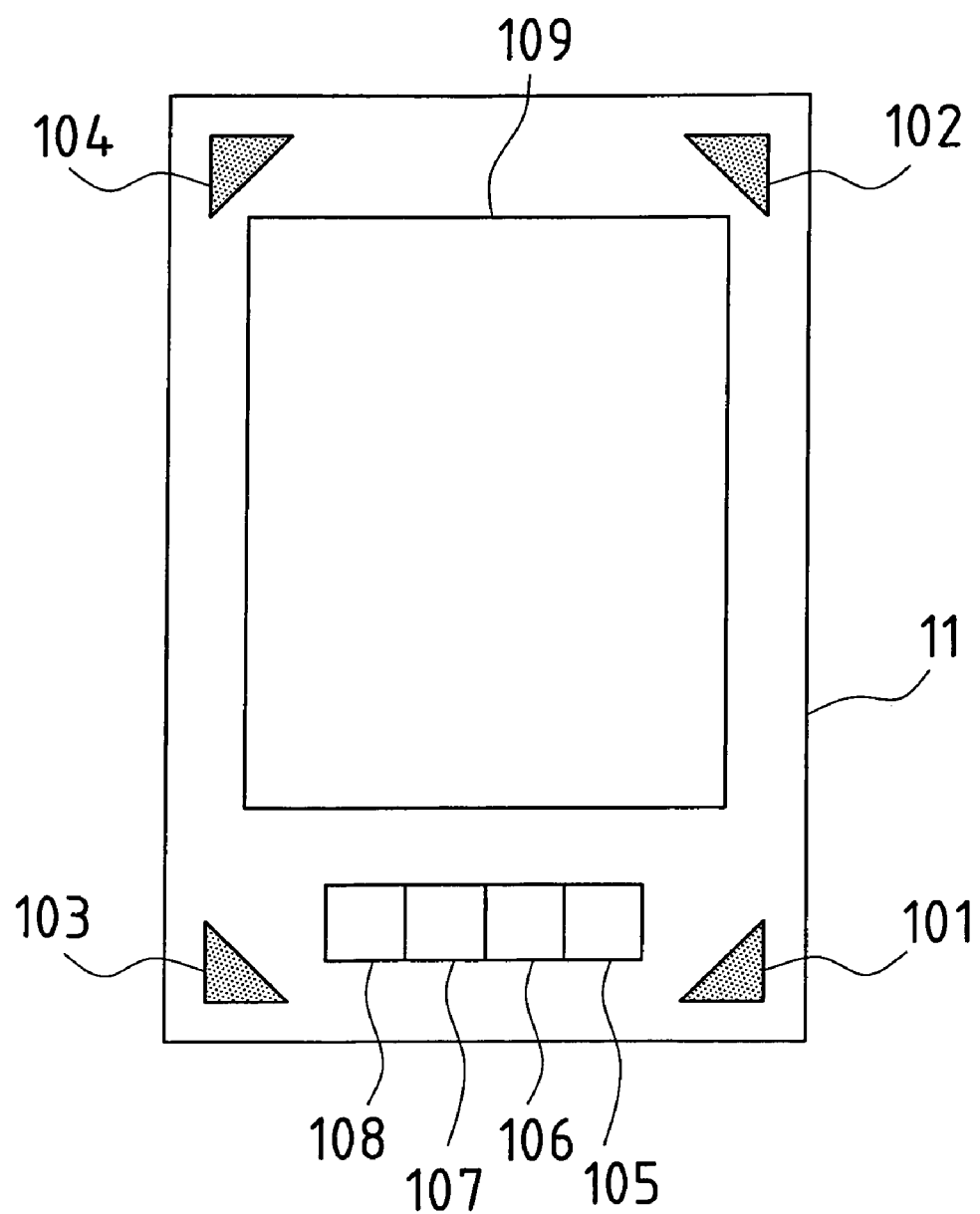
FIG. 2 is an explanatory diagram showing an example of a rewritable medium in which the anti-tampering signature system shown in FIG. 1 is applied.

FIG. 2 is an explanatory diagram showing an example of a rewritable medium in which the anti-tampering signature system shown in FIG. 1 is applied.

The rewritable medium 11 is made of an information indication area 109, a plurality of signature areas (here there are a signature region 105 of a first approver, a signature region 106 of a second approver, a signature region 107 of a third approver, and a signature region 108 of a fourth approver), and two-dimensional barcode indication areas (here there are a two-dimensional barcode indication area 101 of the first approver's encrypted data, a two-dimensional barcode indication area 102 of the second approver's encrypted data, a two-dimensional barcode indication area 103 of the third approver's encrypted data, and a two-dimensional barcode indication area 104 of the fourth approver's encrypted data). The rewritable medium 11 records display data and signature data. Display data such as text and graphics is displayed in the information indication area 109. Furthermore, signature data of the certifiers who certified the display data is displayed in the signature region 105 of the first approver, the signature region 106 of the second approver, the signature region 107 of the third approver, and the signature region 108 of the fourth approver. It should be noted that, when there are multiple certifiers, each of the multiple sets of signature data is indicated individually in one of the signature regions. And furthermore, encrypted data obtained by encrypting the display data at the time of approval, is recorded as barcodes in the two-dimensional barcode indication area 101 of the first approver's encrypted data, the two-dimensional barcode indication area 102 of the second approver's encrypted data, the two-dimensional barcode indication area 103 of the third approver's encrypted data, and the two-dimensional barcode indication area 104 of the fourth approver's encrypted data. It should be noted that the position in which recording is performed is decided corresponding to the order in which signing occurred.

Figure 3:
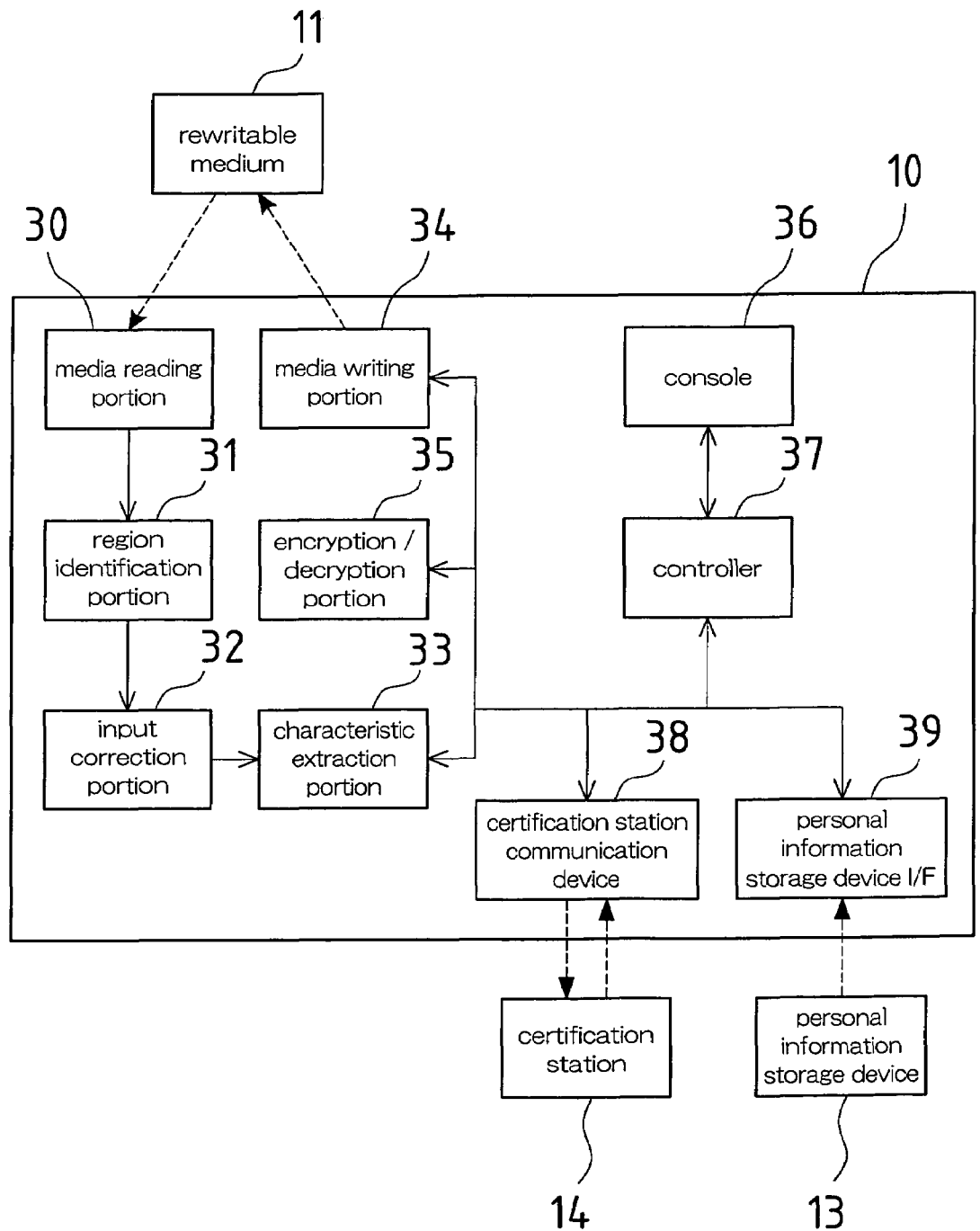
FIG. 3 is an explanatory diagram showing one embodiment of an anti-tampering signature apparatus according to the present invention.

FIG. 3 is an explanatory diagram showing one embodiment of an anti-tampering signature apparatus according to the present invention.

The anti-tampering signature apparatus 10 is constituted by a console 36, a controller 37 as a means for judging tampering, a media reading portion 30, a region identification portion 31, an input correction portion 32, a characteristic extraction portion 33 as a means for extracting a characteristic quantity, a media writing portion 34 as an appending means, an encryption/decryption portion 35 as a means for encrypting and decrypting, a certification station communication device 38, and a personal information storage device I/F (interface) 39. The anti-tampering signature apparatus 10 is for writing signature data and verifying display data.

The console 36 is used in the case of the user giving an instruction or making a selection and when displaying data to the user. The console 36 is provided with devices such as a keyboard and a monitor.

The controller 37 is constituted by a general-purpose CPU (central processing unit) and not only functions as a means for judging tampering but also controls a series of actions of the anti-tampering signature apparatus.

The media reading portion 30 optically reads the entire display surface of the rewritable medium 11 and converts the information that is read to electric signals. The media reading portion 30 is provided with an unshown CCD (charge coupled device) line image sensor unit and a secondary scanning direction drive system. The media reading portion 30 scans the rewritable medium 11 to generate RGB ("R" is an abbreviation of "red," "G" is an abbreviation of "green," and "B" is an abbreviation of "blue") color signals for each single primary scanning line, then converts the RGB color signals into digital data of an effective range using A/D (analog to digital) conversion and outputs the digital data to the region identification portion 31.

The region identification portion 31 carries out processing with respect to the input data, discriminates regions such as the signature regions and two-dimensional barcode indication areas shown in FIG. 2 as well as other regions, and outputs the input image data after region discrimination to the input correction portion 32.

The input correction portion 32 carries out skew correction and magnification correction using the input image data after region discrimination, then corrects the input data and outputs the corrected input data to the characteristic extraction portion 33.

With respect to the corrected input data, the characteristic extraction portion 33 extracts a characteristic quantity from the input image data based on the region identification result discriminated by the region identification portion 31 in relation to regions excluding the signature regions and the two-dimensional barcode indication areas, and outputs data that represents the extracted characteristic quantity to the encryption/decryption device 35.

The encryption/decryption device 35 carries out encryption of the characteristic quantity or decryption of the encrypted data according to commands from the controller 37.

The media writing portion 34 writes the signature data and the two-dimensional barcode indication areas to the rewritable medium 11.

The certification station communication device 38 carries out communication between the certification station 14 using a network line such as a telephone line or an Internet communications network, and also carries out such functions as queries using signature data and the obtaining of public keys.

The personal information storage device I/F 39 acts as the interface to the personal information storage device 13 and carries out such functions as the obtaining of signature data and private keys.

The following is a description concerning an anti-tampering signature method for rewritable media using an anti-tampering signature system provided with such a configuration.

Figure 4:
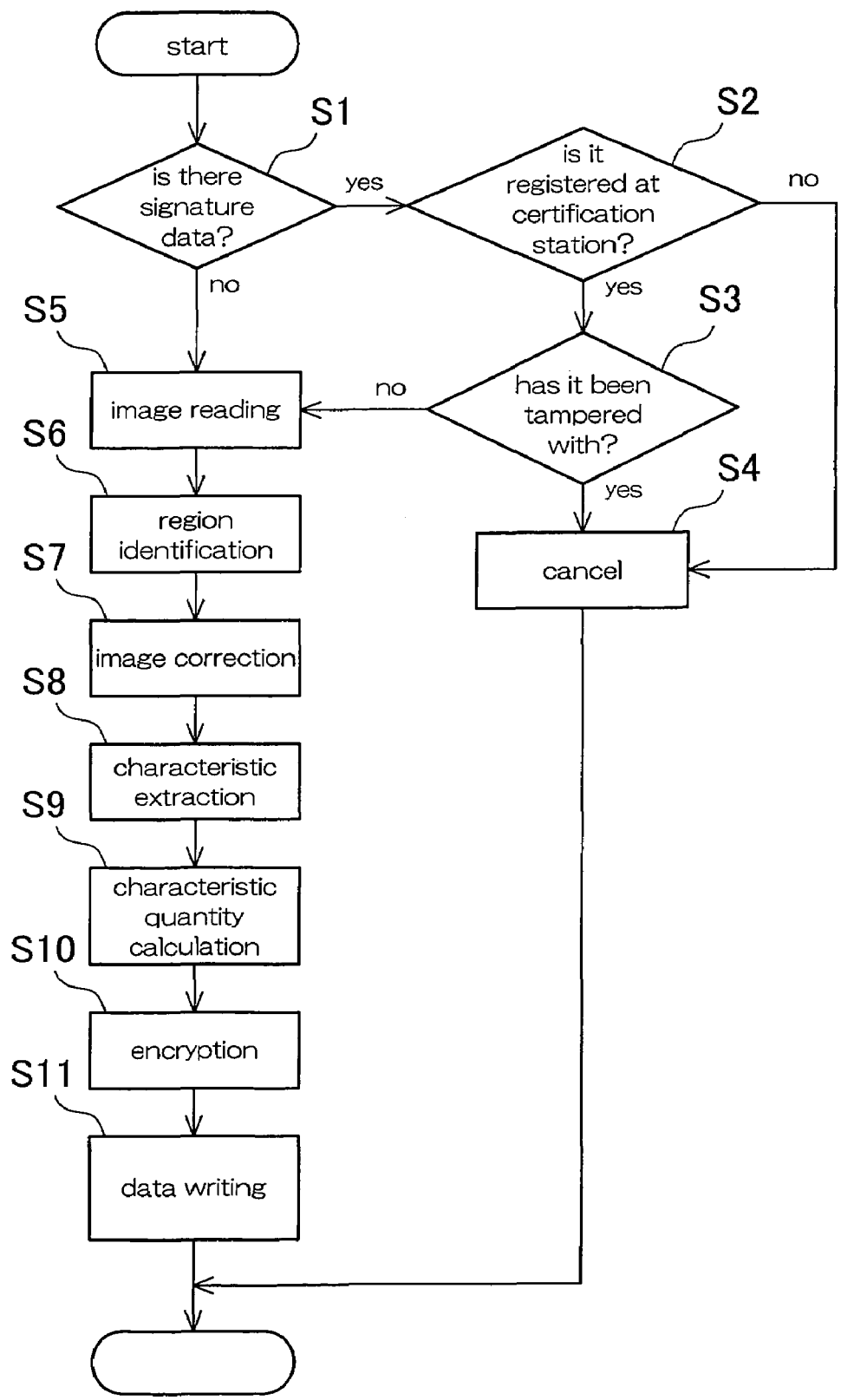
FIG. 4 is a flowchart showing a procedure of writing a signature within one embodiment of an anti-tampering signature method for rewritable media according to the present invention.
Figure 5:
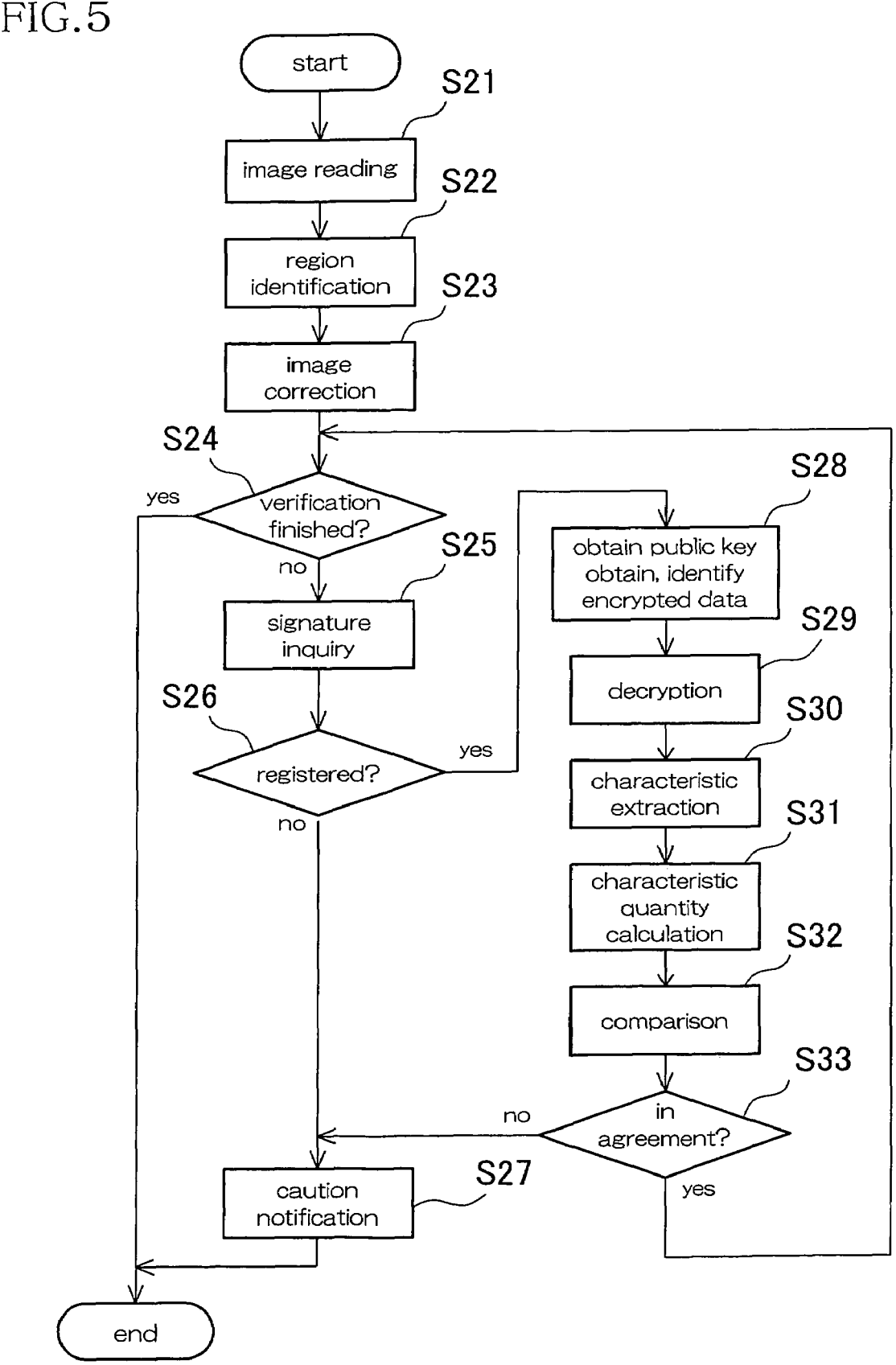
FIG. 5 is a flowchart showing a procedure of confirming a signature within one embodiment of an anti-tampering signature method for rewritable media according to the present invention.
Figure 6:
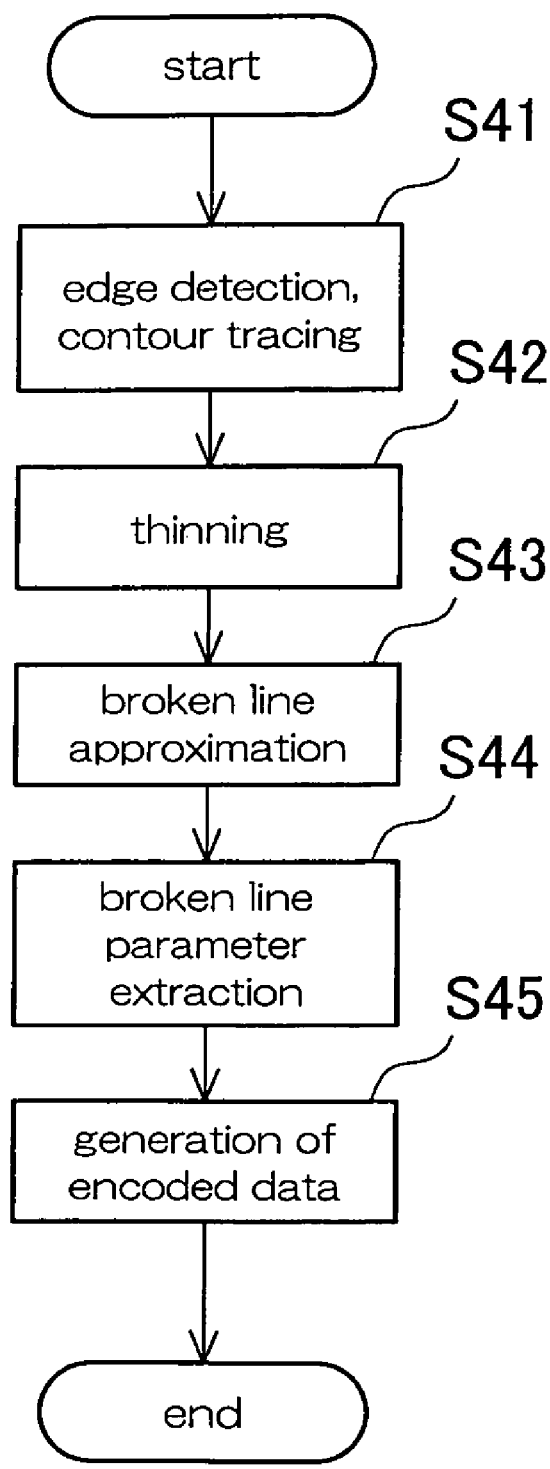
FIG. 6 is a flowchart showing a procedure of extracting a characteristic quantity within one embodiment of an anti-tampering signature method for rewritable media according to the present invention.

FIGS. 4 to 6 are flowcharts showing one embodiment of an anti-tampering signature method for rewritable media according to the present invention. FIG. 4 is a flowchart showing a procedure of writing a signature. FIG. 5 is a flowchart showing a procedure of verifying the signature. FIG. 6 is a flowchart showing a procedure of extracting a characteristic quantity.

Firstly, the following is a description with reference to FIG. 4 of a flow in which a certifier certifies new display data and writes new signature data onto the rewritable medium.

First, a check is carried out as to whether or not there is already written signature data (step S1), and if there is signature data (when the judgment result at step S1 is "yes"), a check is carried out as to whether or not the signature data is registered at the certification station (step S2).

If the signature data is registered at the certification station (when the judgment result at step S2 is "yes"), a check is carried out as to whether or not the display data has been tampered with (step S3).

Here, when the signature data is not registered at the certification station (when the judgment result at step S2 is "no") or when the signature data is registered at the certification station but the display data has been tampered with (when the judgment results at step S2 and step S3 are "yes"), writing of the new first signature data is canceled (step S4) and the process is finished.

On the other hand, when there is no signature data (when the judgment result at step S1 is "no") or when the display data has not been tampered with (when the judgment result at step S3 is "no"), the entire display surface of the rewritable medium is read (step S5), and moreover, a two-dimensional barcode indication area, a signature region, and an information indication area are respectively identified (step S6) in relation to the read image data.

Figure 8:
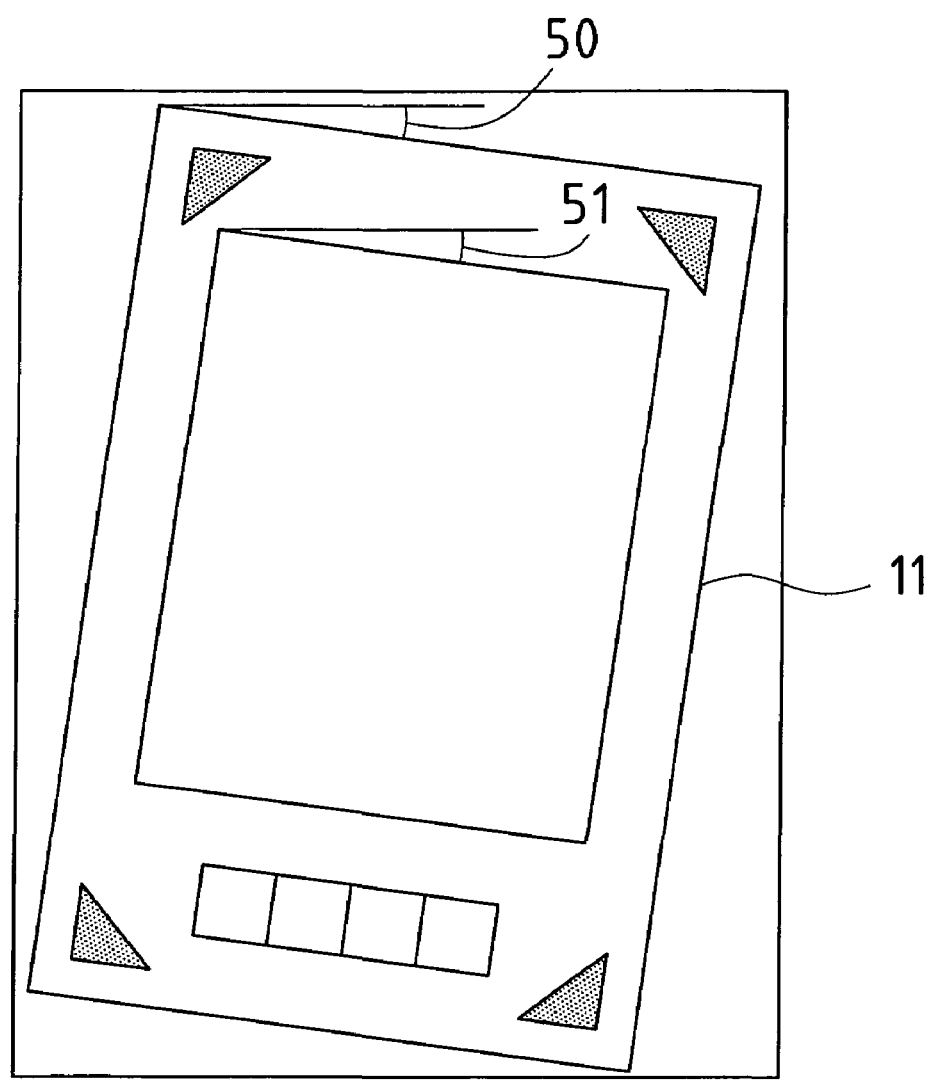

Following this, when the input image has a skew, that is, when there is an angular difference between the horizontal lines of the rewritable medium 11 and the horizontal lines taken in reading as shown in FIG. 8, a skew angle 50 is discriminated from a peripheral edge angle 51 of the information indication area and the skew is subjected to image correction such as correction by an affine transformation to obtain display data (step S7).

Then, a characteristic of the display data that has been obtained by this procedure is extracted (step S8), and moreover, a characteristic quantity is calculated (step S9) by obtaining a 16-byte hash value from a code data string obtained by characteristic extraction using MD5 (message-digest algorithm 5 RFC1321).

After this, the obtained hash value is encrypted (step S10) using the private key obtained from the personal information storage device.

Finally, new signature data read out from the personal information storage device is written in a field following the already written signature data, and the encrypted hash value (new encrypted data) is converted to a two-dimensional barcode and written into it (step S11).

The following is a description with reference to FIG. 5 of a procedure in which the presence/absence of tampering is checked in relation to new display data after signing, that is, a flow in which a check is carried out as to whether or not the new display data and the display data that is currently displayed are the same display data.

First, the entire display surface of the rewritable medium is read (step S21), and moreover, a two-dimensional barcode indication area, a signature region, and an information indication area are respectively identified (step S22) in relation to the read image data.

Following this, if the input image has a skew, the skew angle is discriminated from a peripheral edge angle of the information indication area and image correction is performed for example by correcting the skew by an affine transformation to obtain display data (step S23).

The display data currently displayed in the information indication area and the signature data are obtained from the rewritable medium by carrying out this procedure.

After this, a judgment is made (step S24) as to whether or not there is any unverified signature data among the already written signature data and, if there is unverified signature data (when the judgment result at step S24 is "no"), the procedure proceeds to step S25 and, if there is no unverified signature data (when the judgment result at step S24 is "yes"), the process is finished.

At step S25, the signature data last indicated in the signature regions is sent to the certification station and a look-up is carried out. For example, when signature data is indicated in the first signature region to the third signature region, the new signature data last written into the third signature region is sent to the certification station and a look-up is carried out.

And, for example, when a judgment is made that the new signature data is not registered at the certification station due to a reason such as a reading failure of the new signature data (when the judgment result at step S26 is "no"), a look-up cannot be carried out, and therefore a caution to this effect is notified (step S27) to the user and processing is finished.

On the other hand, when the new signature data has been registered at the certification station (when the judgment result at step S26 is "yes"), information of the registered person and the public key that correspond to the new signature data are received from the certification station and a two-dimensional barcode is read from the two-dimensional barcode indication area that corresponds to the new signature data from the rewritable medium, and encrypted data is obtained (step S28).

Following this, the encrypted data is decoded using the public key, and a characteristic quantity of the certified display data is obtained (step S29). Then, a characteristic quantity is extracted (step S30) from the display data displayed in the information indication area of the rewritable medium that was read in the above step S21, and a characteristic quantity is calculated (step S31).

After this, the characteristic quantity that is displayed in the information indication area and the certified characteristic, quantity are compared (step S32), and a judgment is made as to whether or not the characteristic quantity that is displayed in the information indication area and the certified characteristic quantity match (step S33).

If they match (when the judgment result at step S33 is "yes"), it is assumed that the signature data to be processed has not been tampered with since the time of writing and the procedure returns to step S24, then look-up and characteristic quantity comparison (step S24 to step S33) are repeated for the remaining signature data. Then, when processing is finished for all sets of signature data, a judgment is made at step S24 that all checking is finished (the judgment result at step S24 is "yes"), and therefore processing is finished.

On the other hand, when a judgment is made at step S33 that they are not in agreement (when the judgment result at step S33 is "no"), the signature data to be processed is assumed to have been tampered with after being written, and a caution is notified (step S27) to the user via the console and processing is finished.

Next, the following is a description with reference to FIG. 6 concerning an operation of the characteristic extraction portion that is a part of the anti-tampering signature apparatus.

Here, the description is for an example of a case in which the display of the rewritable medium cannot be read electronically.

Figure 7:
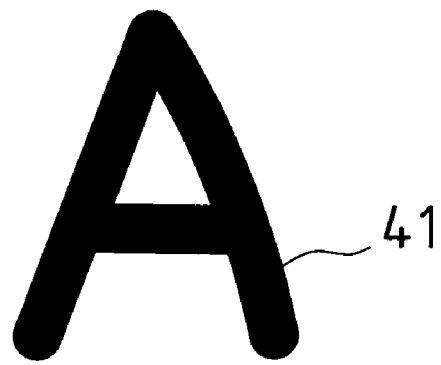
FIG. 7 is an explanatory diagram showing an example of image data obtained in executing the procedure of extracting a characteristic quantity shown in FIG. 6.
Figure 7:
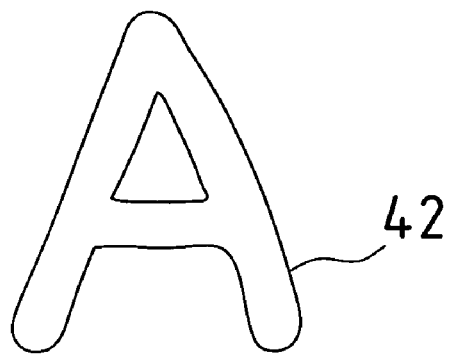
Figure 7:
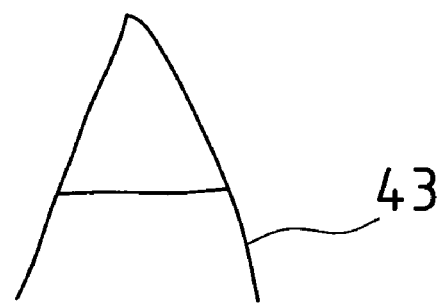
Figure 7:
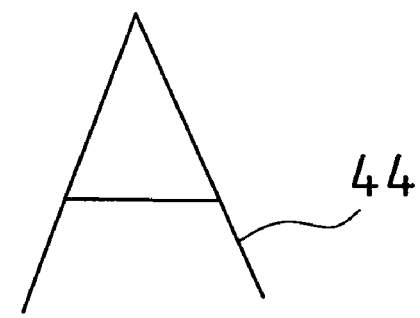

At the time of reading the display data, image data 41 (thick line "A") such as that shown in FIG. 7(a) for example is read, and edge extraction is carried out using this image data. With this edge extraction, first a pixel value p2 (x−1, y) of a pixel P2 to the left of a target pixel P1 is subtracted from a pixel value p1 (x, y) that represents a pixel density of the target pixel P1 (x, y), and if the absolute value of the value obtained by subtraction is above a threshold (Tedge), the target pixel P1 is judged to be an edge pixel. Then, all the pixels that constitute the image data to be processed are binarized into edge pixels and pixels other than edge pixels. After this, all the pixels are scanned in order starting from the top left of the image data, horizontally and vertically in order, and contour tracing is performed (step S41) of the regions enclosed by the edge pixels in the image data with the detected edge pixels as reference points. The result is that contour data 42 such as that shown in FIG. 7(b) is obtained.

Following this, a thinning process is performed (step S42) on the regions enclosed by the contour with the contour data as reference, the result being that thin lines 43 such as shown in FIG. 7(c) are obtained. After this, the obtained thin lines 43 are linearized and undergo broken line approximation (step S43), the result being that an approximated image 44 such as that shown in FIG. 7(d) is obtained.

Following this, all the pixels are scanned in order starting from the top left of the image data, horizontally and vertically in order with reference to the obtained approximated image, and numbering is applied to the broken lines in the order in which the central points of the broken lines are discovered. Further still, respective parameters of the broken line central points (xi, yi), the lengths L of the broken lines, and the angles θi from the horizontal of the broken lines are extracted (step S44) in order of the numbered broken lines.

Finally, the extracted parameters are respectively quantized, and moreover, the quantized values are concatenated in the order of the numbering to generate a code data string (step S45). At this time, in consideration of errors at the time of reading, it is preferable that only parameters capable of being discriminated at the time of reading are concatenated.

Furthermore, the above procedure, namely the anti-tampering signature method for rewritable media, can be realized by an anti-tampering signature program. Moreover, the computer-readable recording medium storing the anti-tampering signature program is contained in the controller 37 of the anti-tampering signature apparatus. Examples of the recording medium include semiconductor storage elements such as mask ROM (read only memory) and flash ROM, hard disks, flexible disks, MO (magneto-optic) disks, CD (compact disc)-ROM, DVD (digital versatile disk)-ROM, magneto-optical disks, IC (integrated circuit) cards, and magnetic tape, and other media may be used as long as the medium is capable of storing the program. Furthermore, the program itself may be one that is transmitted using communications and recorded on a recording medium.

As described above, with the anti-tampering signature method for rewritable media, anti-tampering signature apparatus for executing the method, anti-tampering signature system provided with the apparatus, anti-tampering signature program for achieving the method, and computer-readable recording medium storing the anti-tampering signature program, an encrypted characteristic quantity and an identifier are appended to the display data, and therefore, with the rewritable medium as a discrete entity, a discrimination easily can be made as to whether or not the display data has been tampered with.

Furthermore, since the display contents are extracted in a general manner and the characteristic quantity is extracted from an essential quality of the information, such as character shape information with a distinct edge, it is possible to check the validity of the signature data even with copied materials that have been obtained by copying the display contents of the rewritable medium with a copying machine for example.

Further still, when the rewritable medium is provided with a function for reading the display contents and is a medium capable of electrically reading the display data as values, or when using a rewritable medium that has a sufficiently low rate of reading error due to error-correction techniques or the like with the anti-tampering signature apparatus, it is possible to use the concatenated reading data string of the display data as a code data string. In such cases, since a characteristic quantity is extracted from the actual display contents when the above procedure is carried out, it is possible to check that the display data is exactly the same as when it was signed.

On the other hand, the means for recording the encrypted data in the rewritable medium is not limited to a two-dimensional barcode, and the data may be recorded magnetically by providing a magnetic layer, and it is also possible to mount an IC chip and record the electronic data made from the display data and the encrypted data at the same time on the IC chip.

It should be noted that the regions on the rewritable medium (signature regions, two-dimensional barcode indication areas, and information indication areas) do not have to have fixed positions. When the positions of these are not fixed, it is possible to have processing proceed in each region separately based on region discrimination. Furthermore, in regard to signature data, all analogous data may be discriminated by inquiries to the certification station.

INDUSTRIAL APPLICABILITY

When reading display data at the time of certifying and after certifying, even when both sets of read data contain inconsistent elements due to fluctuations or the like, since in the present invention characteristic quantities are respectively extracted from the read data and compared based on the extracted characteristic quantities of both sets, the present invention is useful in being able to always accurately discriminate the presence/absence of tampering and will offer superior effectiveness in preventing tampering.

The invention claimed is:

1. An anti-tampering signature method comprising the steps of:

provding a rewriteable medium including (i) an information display area wherein display data is stored in a visually viewable, rewritable and erasable state, (ii) a plurality of display data certifier identification areas wherein display data certifier signature information is stored in a visually viewable, rewritable and erasable state; and (iii) a plurality of certification data areas corresponding respectively to each said certifier identification area for displaying and storing certification data respectively indicates a registration status of an associated certifier signature information in a visually viewable, rewritable and erasable state;

determining whether or not said certifier signature information contained in each of said plurality of display data certifier identification areas, or to be added to one or more of said display data certifier identification areas, matches with corresponding registered certifier signature information stored in, or separately added to, a registered certifier signature information database, and, in those cases wherein a match is judged to be present, adding said registration status of said certifier signature information to said certification data areas associated with the certifier identification area displaying said certifier signature information, and in those cases wherein a match is not judged to be present, issuing a warning that signature tampering may have occurred;

extracting as a characteristic quantity a general characteristic of image data generated by reading the display data according to an instruction from a certifier who has certified the display data, generating encrypted data by encrypting said characteristic quantity using an encryption key paired with an identifier, appending each said identifier and its associated encrypted data to the rewritable medium in a certification data area corresponding to the certifier who issued the instruction for the extraction of the characteristic information, obtaining the encryption key based on the identifier according to an instruction of a verifier who verifies a certificate, decrypting the obtained characteristic quantity of the display data, and judging whether or not the decrypted characteristic quantity obtained by decrypting the encrypted data and the characteristic quantity of the display data match, and, in those cases wherein a match is not judged to be present, issuing a warning that signature tampering may have occurred.

2. An anti-tampering signature apparatus for executing an anti-tampering signature method comprising:

a rewriteable medium including (i) an information display area wherein display data is stored in visually viewable, rewritable and erasable state, (ii) a plurality of display data certifier identification areas wherein display data certifier signature information is stored in a visually viewable, rewritable and erasable state; and (iii) a plurality of certification data areas corresponding respectively to each said plurality of display data certifier identification area for displaying and storing certification data respectively indicates a registration status of an associated certifier signature information in a visually viewable, rewritable and erasable state;

first tampering judgment means for determining whether or not said certifier signature information contained in each of said plurality of display data certifier identification areas, or to be added to one or more of said plurality of display data certifier identification areas, matches with corresponding registered certifier signature information stored in, or separately added to, a registered certifier signature information database, and for in those cases wherein a match is judged to be present, adding said registration status of said certifier signature information to said certification data areas associated with the certifier identification area displaying said certifier signature information, and in those cases wherein a match is not judged to be present, issuing a warning that signature tampering may have occurred;

said determination including:

characteristic quantity extraction means for extracting as a characteristic quantity a general characteristic of image data generated by reading the display data according to an instruction from a certifier who has certified the display data, encryption/decryption means that generates encrypted data by encrypting said characteristic quantity using an encryption key paired with an identifier, and decrypts the encrypted data into said characteristic quantity, appending means for appending each said identifier and its associated encrypted data to the rewritable medium in a certification data area corresponding to the certifier who issued the instruction for the extraction of the characteristic information, and second tampering judgment means for judging whether or not the decrypted characteristic quantity and the characteristic quantity of the display data match, and, in those cases wherein a match is not judged to be present, issuing a warning that signature tampering may have occurred.

3. An anti-tampering signature system wherein display data is displayed on a rewritable medium including (I) an information display area wherein display data is stored in a visually viewable, rewritable and erasable state, (ii) a plurality of display data certifier identification areas wherein display data certifier signature information is stored in a visually viewable, rewritable and erasable state; and (iii) a plurality of certification data areas corresponding respectively to each said plurality of display data certifier identification area for displaying and storing certification data respectively indicates a registration status of an associated certifier signature information in a visually viewable, rewritable and erasable state is certified, comprising:

first tampering judgment means for determining whether or not said certifier signature information contained in each of said plurality of display data certifier identification areas, or to be added to one or more of said plurality of display data certifier identification areas, matches with corresponding registered certifier signature information stored in, or separately added to, a registered certifier signature information database, and for in those cases wherein a match is judged to be present, adding said registration status of said certifier signature information to said certification data areas associated with the certifier identification area displaying said certifier signature information, and in those cases wherein a match is not judged to be present, issuing a warning that signature tampering may have occurred;

encryption key generating means that registers an identifier and generates an encryption key, storage means for storing the identifier and the encryption key, certifying means that supplies the encryption key according to a query based on the identifier, characteristic quantity extraction means for extracting as a characteristic quantity a general characteristic of image data generated by reading the display data according to an instruction from a certifier who has certified the display data, encryption/decryption means that generates encrypted data by encrypting said characteristic quantity using an encryption key paired with an identifier and decrypts the encrypted data into said characteristic quantity, appending means for appending each said identifier and its associated encrypted data to the rewritable medium in a certification data area corresponding to the certifier who issued the instruction for the extraction of the characteristic information, and a second tampering judgment means for judging whether or not the decrypted characteristic quantity and the characteristic quantity of the display data match, and, in those cases wherein a match is not judged to be present, issuing a warning that signature tampering may have occurred.

4. A computer-readable recording medium on which is stored an anti-tampering signature program for causing a computer to perform an anti-tampering signature method with respect to a rewritable medium including (I) an information display area wherein display data is stored in a visually viewable, rewritable and erasable state, (ii) a plurality of display data certifier identification areas wherein display data certifier signature information is stored in a visually viewable, rewritable and erasable state; and (iii) a plurality of certification data areas corresponding respectively to each said certifier identification area for displaying or storing certification data respectively indicates a registration status of an associated certifier signature information in a visually viewable, rewritable and erasable state, said anti-tampering signature program comprising the steps of:

determining whether or not certifier signature information contained in said plurality of display data certifier identification areas, or to be added to, one or more of said plurality of display data certifier identification areas, matches with corresponding registered certifier signature information stored in, or separately added to, a registered certifier signature information database, and, in those cases wherein a match is judged to be present, adding said registration status of said certifier signature information to said certification data areas associated with the certifier identification area displaying said certifier signature information, and in those cases wherein a match is not judged to be present, issuing a warning that signature tampering may have occurred;

extracting as a characteristic quantity a general characteristic of image data generated by reading the display data according to an instruction from a certifier who has certified the display data, generating encrypted data by encrypting said characteristic quantity using an encryption key paired with an identifier, appending each said identifier and its associated encrypted data to the rewritable medium in a certification data area corresponding to the certifier who issued the instruction for the extraction of the characteristic information, obtaining the encryption key based on the identifier according to an instruction of a verifier who verifies a certificate, decrypting the obtained characteristic quantity of the display data, and judging whether or not the decrypted characteristic quantity obtained by decrypting the encrypted data and the characteristic quantity of the display data match, and, in those cases wherein a match is not judged to be present, issuing a warning that signature tampering may have occurred.

\* \* \* \* \*